UNITED STATES PATENT OFFICE.

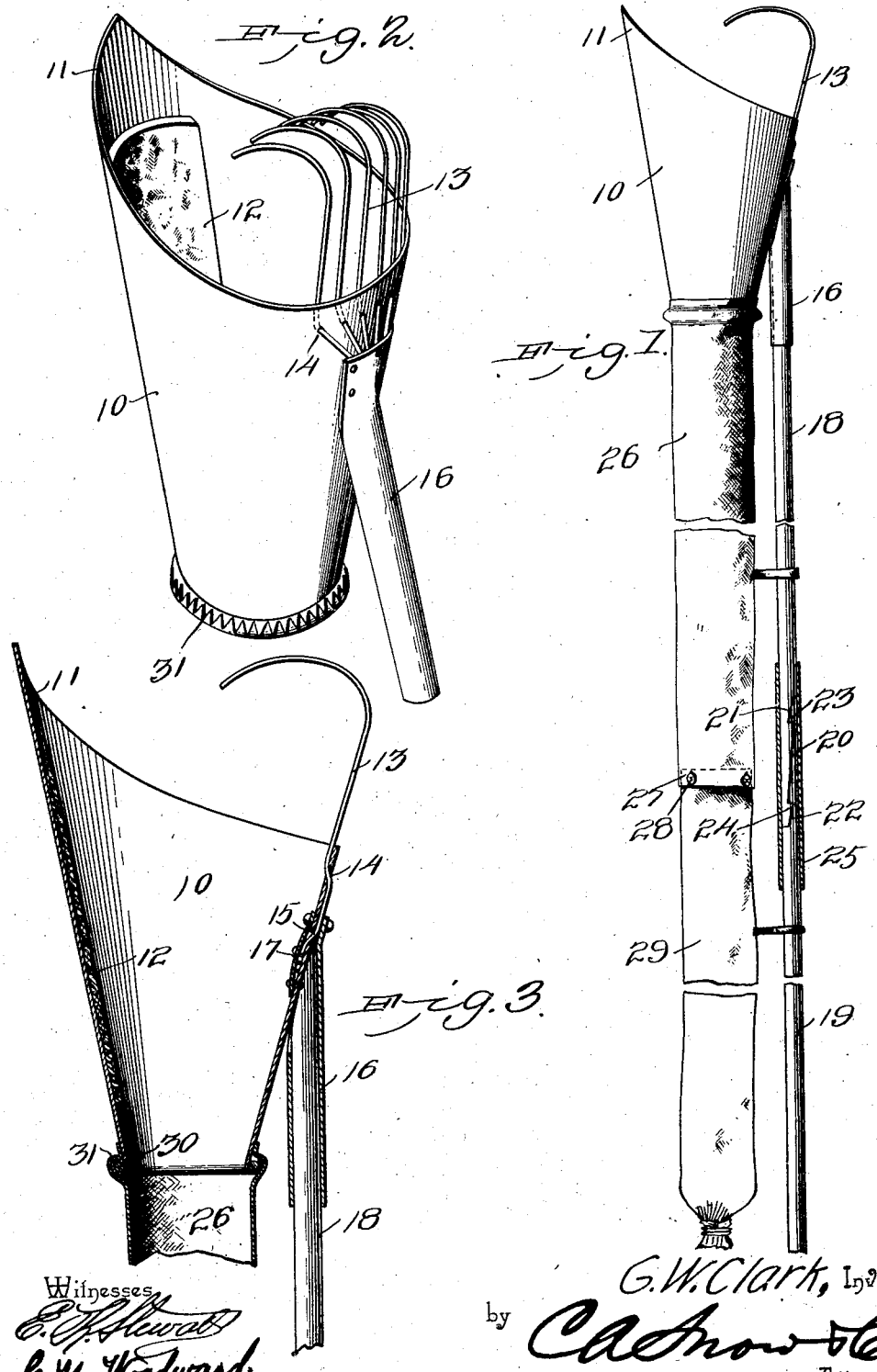

GEORGE WESLEY CLARK, OF OPAL, VIRGINIA.

FRUIT-PICKER.

SPECIFICATION forming part of Letters Patent No. 721,154, dated February 24, 1903.

Application filed September 30, 1902. Serial No. 125,389. (No model.)

*To all whom it may concern:*

Be it known that I, GEORGE WESLEY CLARK, a citizen of the United States, residing at Opal, in the county of Fauquier and State of Virginia, have invented a new and useful Fruit-Picker, of which the following is a specification.

This invention is an improvement in fruit-pickers, and has for its object the production of a simple device which may be extended longitudinally to adapt it to the location of the fruit upon the trees and by means of which the more delicate and fragile fruits may be gathered without injury; and the invention consists in certain novel features of construction, as hereinafter shown and described, and specified in the claims.

In the drawings illustrative of the invention, Figure 1 is a side elevation of the improved device. Fig. 2 is an enlarged perspective view of the receiving-receptacle. Fig. 3 is a vertical sectional elevation of the parts shown in Fig. 2 and on the same scale, a portion of the conductor and operating-handle being also indicated.

The improved device consists in a receptacle 10 of any suitable size or shape, but preferably tapering from the inlet to the discharge end, as shown. The inlet end of the receptacle will be formed with one side 11 elevated, as shown, and provided on the interior with a cushion 12, of some soft yieldable material—such as felt, cork, soft rubber, or the like—against which the fruit will impinge when first picked, and thus be prevented from abrasion. This cushion 12 may be of any required size and may be varied according to circumstances. Rising from the opposite side of the receptacle 10 from the elevated portion 11 are a plurality of spaced wire fingers 13, the latter forming the picking means by which the fruit is severed from the tree. These fingers 13 will be spaced apart to any required extent and as many may be employed as found necessary or as the size of the fruit to be picked may require. The fingers 13 will be curved inward at their upper ends toward the elevated side 11 and project partially over the receptacle, as shown. The fingers 13 will be attached to the receptacle 10 by threading them alternately through apertures 14 15 in the receptacle and riveting the upper end of the handle-socket 16 over the finger-wires, while a clamp-plate 17 is likewise riveted over the finger-wires upon the interior of the receptacle, the same rivets preferably passing through the three parts 10 16 17, as indicated. By this simple means the fingers 13 are securely connected to the receptacle and all the parts firmly bound and united, the clamp-plate 17 thus performing a twofold function—first, as a support to the finger-wires, and, second, as a means for assisting in supporting the handle-socket.

The handle member is preferably formed in two or more sections 18 19, united by a scarf-joint 20, with recesses 21 22, formed, respectively, in the sections 18 19, adapted to receive corresponding projections 23 24 upon the outer ends of the handle members, the whole joint held in place by a slidable ferrule 25, as shown. By this simple means a relatively elongated joint is formed, firmly held in place by the ferrule member 25, while the interengaging notches and projections at the ends of the joint prevent any longitudinal movement. This makes a very secure and firm joint, which may be readily united or disconnected when required. The section 18 will be long enough to enable the operator to reach fruit upon low or small-sized trees, while the section 19 will be added when fruit is to be picked from the higher branches of trees. As many of the handle-sections may be employed as required, so that the receptacle and the picking-fingers carried thereby may reach the highest fruit upon the trees.

Attached to the discharge end of the receptacle is a yieldable conductor 26, preferably formed of cloth of suitable texture and in tubular form. The conductor will be constructed in sections corresponding to the handle-sections, so that the joints 27 between the conductor-sections will come opposite the ferrules 25, and as many of the conductor-sections will be employed as there are handle-sections. The joints 27 between the conductor-sections may be formed in any suitable manner; but for the purpose of illustration they are shown provided with buttons 28 upon one section, adapted to engage corresponding buttonholes in the adjacent section, the latter being indicated at 29.

The manner by which the conductor is detachably connected to the receptacle is one of the novel features of the invention and is constructed as follows: The lower converging end of the receptacle is provided with an inclosing ring of wire 30, around which the lower edge of the receptacle is partially folded, so that the lower rim of the receptacle is turned upward and will be serrated, as shown at 31, the serrations projecting above the inclosing coil 30 and affording means for engaging and supporting the tubular cloth-conductor section 26 when drawn over the lower end of the receptacle, as indicated in Fig. 3. By this simple means the cloth conductor is firmly supported in place and adapted to resist all strains to which it will be subjected when in use, while at the same time the conductor may be readily released by drawing upward upon the upper end and detaching it from the serrations 31.

In using the implement the receptacle 10 is placed over the fruit to be plucked with the fingers 13 on the downward side and with the stem of the fruit between a pair of the fingers, which action will bring the fruit into engagement with the soft cushion 12, thereby preventing injury to the fruit. When the stem is broken by the manipulation of the handle member, the fruit will be carried downward through the conductor to the storage vessel. In this connection, it will noted, the diverging form of the receptacle 10 is an important feature of the invention, as the fruit is thereby gradually guided into the flexible conductor over the yielding cushion and does not come in contact with abrupt corners or obstructions in its passage to the storage vessel. By this means the most delicate and fragile fruits may be plucked without injury thereto and the most distant specimens reached by extending the handle member, as above noted.

The construction herein illustrated produces a very strong and durable implement, while at the same time a very inexpensive and easily-constructed one.

The elevated side 11 of the receptacle 10 is also an important feature of the invention, as the fruit is thereby more easily entered into the receptacle and does not require as much adjusting of the implement as would be the case if the upper surface of the receptacle were at right angles to its longitudinal axis.

The handle member may be removed from the socket 16 and the sections 18 19 disconnected to enable the device to be packed away in a small space when not in use or when being transported.

The parts may be constructed in any required size to adapt the device to different-sized fruit, and the parts may be modified in minor particulars without affecting the principle of the invention or sacrificing any of its advantages.

The receiver 10 and handle-socket 16 will generally be of sheet metal, but may be of other material if preferred.

In using the device the lower end of the conductor 26 may be closed, as by tying, as illustrated in Fig. 1, so that the fruit may be retained in the conductor until the latter is full and then discharged into the receptacle, thus facilitating the operation and avoiding damage to the fruit. The conductor 26 will preferably be connected at intervals to the handle member, as by straps, (shown in Fig. 1,) to prevent the conductor from swaying laterally.

Having thus described the invention, what is claimed is—

1. In a fruit-picker, a receptacle, a plurality of spaced picking-fingers formed of wires threaded alternately through apertures in the receptacle, a handle-socket engaging said spaced wires exteriorly of the receptacle, a clamp-plate engaging said wires interiorly of the receptacle, and rivets connecting said socket and plate through the wall of the receptacle, substantially as described.

2. In a fruit-picker, a receptacle having its discharge end serrated and turned upward, in combination with a conductor of yieldable material engaging said serrations and supported thereby upon the receptacle, substantially as described.

In testimony that I claim the foregoing as my own I have hereto affixed my signature in the presence of two witnesses.

GEORGE WESLEY CLARK.

Witnesses:
WILLIAM O. SHUMATE,
ROBERT E. LEE.